Oct. 17, 1967 R. VICHR 3,348,113
SPEED CONTROL CIRCUIT FOR A MULTI-SPEED
ELECTRIC COMMUTATOR MOTOR
Filed May 4, 1965

INVENTOR.
Radek Vichr
BY Richard Cud
ag't

United States Patent Office
3,348,113
Patented Oct. 17, 1967

3,348,113
SPEED CONTROL CIRCUIT FOR A MULTISPEED ELECTRIC COMMUTATOR MOTOR
Radek Vichr, Brno, Czechoslovakia, assignor to Presna mechanika narodny podnik, Stara Tura, Czechoslovakia
Filed May 4, 1965, Ser. No. 452,970
Claims priority, application Czechoslovakia, May 7, 1964, 2,660/64
2 Claims. (Cl. 318—345)

This invention relates to a speed control circuit for multi-speed electric motors, particularly for small direct current commutator motors, as used for instance as driving motors of magnetophones, gramophones and of similar devices.

The speed of small direct current commutator motors is currently adjusted by means of vibratory centrifugal regulators, which maintain the revolutions of the electric motors on a constant value with relatively high accuracy by adjusting a regulating resistance or transistor. These regulators work satisfactorily in case only one constant speed is required.

In case more predetermined numbers of revolutions of commutator motors have to be adjusted, a single rotary regulator is generally used, provided with a system of contacts, each of which relates to one of said speeds. The speed control is accomplished by disconnecting or connecting a resistor system into the supply circuit of the electric motor. The selection of the required number of revolutions at which the electric motor has to be stabilized is accomplished by a change-over switch, by means of which the respective contact, controlled by centrifugal force is interconnected.

A drawback of these regulators is that the number of sliding contacts has to be increased in case several speeds have to be adjusted, resulting in difficulties with design and in an increase of the fundamental braking moment of the electric motor.

It is an object of this invention to remove these drawbacks.

An advantage of the speed control circuit according to this invention is, that the change of the required speed can be made in the course of operation without bringing the electric motor to a stop, whereby a couple of slip ring contacts is sufficient for a number of different speeds.

Figure 1:
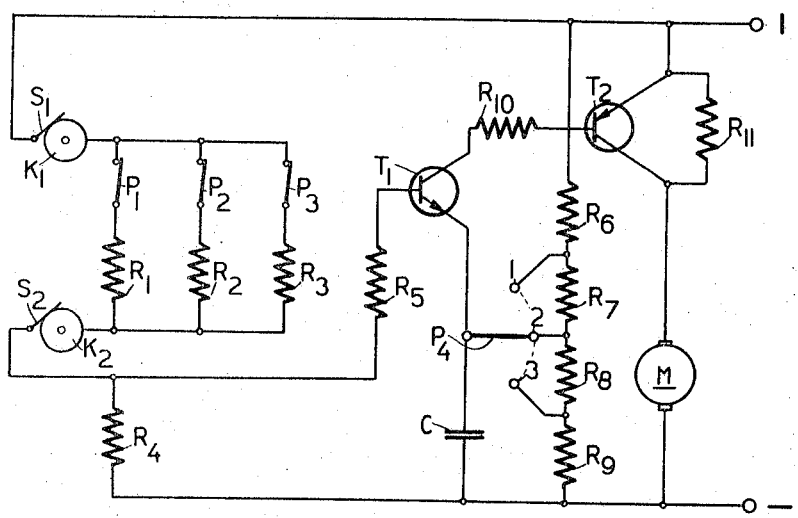

A practical embodiment of a speed control circuit for several predetermined numbers of revolutions of commutator motors is shown by way of example in the accompanying drawing where FIG. 1 represents a wiring diagram of the speed control circuit.

Figure 2:
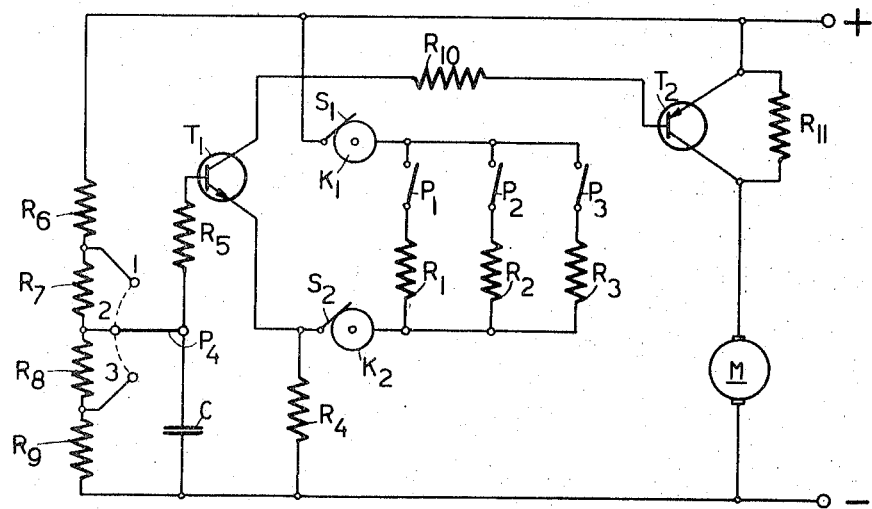

FIG. 2 an alternative arrangement of this circuit.

Referring to FIG. 1 resistors $R_1$, $R_2$, $R_3$ are connected in parallel to the collecting slip rings $K_1$ and $K_2$ by way of disconnecting contacts $P_1$, $P_2$, $P_3$. The disconnecting contacts $P_1$, $P_2$, $P_3$ are controlled by not shown weights of different magnitude and are disconnected by the action of centrifugal force in dependence upon the number of revolutions of the electric motor M. The disconnecting contacts $P_1$, $P_2$, $P_3$ and the resistors $R_1$, $R_2$, $R_3$ are arranged in the rotating part of the electric motor M. The slip ring $K_1$ is connected by way of the collecting contact $S_1$ to the positive pole of a source of D.C. voltage, while the slip ring $K_2$ is connected by way of the collecting contact $S_2$ and the resistor $R_4$ to the negative pole of the source of D.C. voltage. The resistors $R_1$, $R_2$, $R_3$ represent together with the resistor $R_4$ an adjustable control voltage divider, the tap of which is connected over a limiting resistor $R_5$ to the base electrode of transistor $T_1$ of the NPN type. The emitter electrode of the transistor $T_1$ is connected by way of the filter condenser C to the negative pole of the source of D.C. voltage. The emitter electrode of the transistor $T_1$ is furthermore connected over the change-over switch $P_4$ to a second adjustable voltage divider consisting of the resistors $R_6$, $R_7$, $R_8$, $R_9$. The collector electrode of the transistor $T_1$ is connected over a limiting resistor $R_{10}$ to the base electrode of a complementary transistor $T_2$ of the PNP type, the emitter electrode of which is connected to the positive pole of the source of D.C. voltage. The commutator motor is connected between the collector electrode of the transistor $T_2$ and between the negative pole of the source of D.C. voltage. A resistor $R_{11}$ is connected between the emitter and collector electrodes of the transistor $T_2$.

The control circuit according to FIG. 2 differs only in that the adjustable control voltage divider composed of the resistors $R_1$, $R_2$, $R_3$, $R_4$ with the contacts $P_1$, $P_2$, $P_3$ is connected in the emitter circuit of the transistor $T_1$ while the second adjustable voltage divider composed of resistors $R_6$, $R_7$, $R_8$, $R_9$ is connected in the base circuit of the transistor $T_1$.

The adjustable control voltage divider feeding the base electrode of the transistor $T_1$ has to be designed so that in case the speed of the electric motor increases, the voltage of the base electrode decreases by steps, whereby each step corresponds to a certain number of revolutions, adjusted by the respective disconnecting contact. In the case given a system of disconnecting contacts has to be used for the upper value of the adjustable control voltage divider or a system of closing contacts for the lower value of the adjustable control voltage divider. In case the adjustable control voltage divider is arranged in the emitter circuit and the adjustable voltage divider in the base circuit of the transistor $T_1$, the conditions are changed. The system of disconnecting contacts can be used for the lower value of the adjustable control voltage divider, whereas closing contacts are arranged for the upper value of the adjustable voltage divider.

In case transistors with reversed polarities are used, rules known to those familiar with transistor technique have to be applied.

The described system operates as follows:

By switching over the change-over switch $P_4$ to position 1 a voltage is supplied to the transistor $T_1$ determined by the relation of the resistance $R_6$ to the resistances $R_7$, $R_8$, $R_9$ corresponding to the lowest number of adjusted revolutions of the electric motor M. After the source of D.C. voltage has been connected, a lower voltage shows on the emitter electrode of the transistor $T_1$ than on its base electrode. The transistor $T_1$ together with transistor $T_2$ are opened. Simultaneously the electric motor M, supplied by way of the transistor $T_2$, starts to move. As soon as the speed of the electric motor M surpasses the lowest adjusted value, the disconnecting contact $P_1$ is opened due to centrifugal force. The resistor $R_1$ is disconnected, the resulting resistance of the resistor $R_2$ and $R_3$, connected in parallel, is increased and the voltage on the base electrode of the transistor $T_1$ drops so that it becomes closed together with the transistor $T_2$. The electric motor M is supplied solely by way of the resistor $R_{11}$ and its speed drops to a value, where the disconnecting contact $P_1$ is again closed. By repeating this operation the speed of the electric motor M is maintained at a predetermined level.

By switching over the change-over switch $P_4$ to position 2, a lower voltage is connected to the emitter of transistor $T_1$ said voltage determined by the relation of the resistances $R_6$, $R_7$ to the resistances $R_8$, $R_9$ and corresponding to the subsequently higher adjusted number of revolutions of the electric motor M. The electric motor M starts to move after the source of D.C. voltage is connected. In case the lowest number of adjusted revolutions is exceeded, the disconnecting contact $P_1$ is opened. The voltage on the base electrode of the transistor $T_1$ is thus reduced, but as the emitter electrode is connected to a lower voltage than in the preceding case, the transistors $T_1$ and $T_2$ are not closed and the speed of the electric motor M still increases. As soon as this speed exceeds the second predetermined number of revolutions, the disconnecting contact $P_2$ is opened so that the voltage on the base electrode of transistor $T_1$ drops so far, that the transistors $T_1$ and $T_2$ are closed. The electric motor M is again fed only by way of the resistor $R_{11}$ and its speed drops again. As soon as the second predetermined number of revolutions of the electric motor M is achieved, the disconnecting contact $P_2$ is again closed and the whole cycle is repeated.

The same takes place in case the third predetermined number of revolutions is adjusted by switching over the change-over switch $P_4$ to position 3.

Thus the adjustment of any required number of predetermined speeds of commutator motors can be achieved.

I claim:

1. A speed control circuit for a multi-speed electric commutator motor comprising a first transistor, a complementary second transistor, a first voltage divider, a second voltage divider, both said voltage dividers connected to a source of supply voltage, a number of contacts controlled by centrifugal force due to rotation of the electric motor, said contacts adapted to adjust the distribution of voltage on said first voltage divider, parts of said first voltage divider and said contacts arranged on the rotating part of the electric motor, a couple of slip ring conacts adapted to connect the elements on the rotating part of the electric motor with the remaining stationary elements, a change-over switch adapted to select the required tap on said second voltage divider, the tap of the first voltage divider connected by way of a limiting resistor to the base electrode of the first transistor, the emitter electrode of the first transistor connected by way of said change over switch to the second voltage divider, the collector electrode of the first transistor connected by way of a resistor to the base electrode of the second transistor, the emitter electrode of the second transistor connected to one pole of the supply voltage, its collector electrode connected by way of the controlled electric commutator motor to the second pole of the supply voltage, a resistor connected between the emitter and collector electrodes of the second transistor.

2. A speed control circuit for a multi-speed electric commutator motor comprising a first transistor, a complementary second transistor, a first voltage divider, a second voltage divider, both said voltage dividers connected to a source of supply voltage, a number of contacts controlled by centrifugal force due to rotation of the electric motor, said contacts adaped to adjust the distribution of voltage on said first voltage divider, parts of said first voltage divider and said contacts arranged on the rotating part of the electric motor, a couple of slip ring conacts adapted to connect the elements on the rotating part of the electric motor with the remaining stationary elements, a change-over switch adapted to select the required tap on said second voltage divider, the tap of the second voltage divider connected by way of a resistor to the base electrode of the first transistor, the collector electrode of the first transistor connected by way of a resistor to the base electrode of the second transistor, the emitter electrode of the first transistor connected to the tap of the first voltage divider, the emitter electrode of the second transistor connected to one pole of the supply voltage, its collector electrode connected by way of the controlled electric commutator motor to the second pole of the supply voltage, a resistor connected between the emitter and collector electrodes of the second transistor.

No references cited.

J. BAKER, *Assistant Examiner.*

ORIS L. RADER, *Primary Examiner.*